Patented Jan. 4, 1949

2,458,039

UNITED STATES PATENT OFFICE 2,458,039

AGGREGATE FOR IMPROVING PORTLAND CEMENT CONCRETES

Bertrand H. Wait, New Rochelle, N. Y.

No Drawing. Application October 5, 1945,
Serial No. 620,629

2 Claims. (Cl. 106—288)

My invention relates to Portland cement concrete and particularly to an aggregate which, although it usually has little cementing properties per se, nevertheless may be used to replace a portion of the Portland cement which would normally be employed, and which, because of its latent cementing and other properties, will substantially improve the strength, density and uniformity of the concrete, enhance its resistance to the disintegrating effects of freezing and thawing, and to the attack of water borne media such as the salts, acids and alkalies encountered in sea water, sewage and various industrial wastes, and in the ice control treatments of concrete pavements.

The setting phenomenon of Portland cement is attended by the release of substances, primarily lime hydrate, which are partially soluble in water and even when not leached out of a cementitious matrix are subject to wide variations in volume both during formation and in the presence of varying degrees of moisture. Under the most favorable conditions the carbon dioxide in the atmosphere combines with the lime hydrate to form calcium carbonate, a substance only slightly soluble in ordinary water, which serves to fill the pores in the surface of the concrete and to form an envelope about the concrete. Calcium carbonate, however, is not only soluble in water containing carbon dioxide but also in sea water, sewage, industrial wastes and the like containing various solvents. If the calcium carbonate envelope is not dissolved it remains as a hard, brittle, crystalline substance which is a serious disadvantage in concrete or mortars which are subjected to variations in temperature or moisture. The calcium carbonate crystals have a different coefficient of expansion than the material in the interior of the concrete and this is a contributing cause, if not one of the prime causes, of scaling followed by progressive and destructive disintegration of the concrete. Thus, the substances released by the setting of the Portland cement, unless otherwise neutralized or chemically satisfied remain as a permanent threat to the integrity and durability of concretes and mortars made therefrom.

Attempts have been made to prevent the entrance of water and water borne corrosive media into concrete by intergrinding the cement with substances that produce water soluble soaps or other saponaceous substances which froth and thereby entrain air in the form of minute bubbles. In some cases these substances, at least in part, are converted into insoluble soaps by the lime released during the progressive hydration of the cement, but this conversion utilizes only a minute proportion of the undesirable lime. Furthermore, it has been demonstrated that practically all of the effect of such water-proofing agents is on the aggregate rather than on the cement and that the activity of such air entraining agents is influenced to a marked degree by factors such as the particle size of the sand, the quantity of mixing water and the physical conditions, such as time and temperature, attending the mixing and manipulation of the concrete. Although water-proofing has generally been achieved the concrete has frequently been deficient in strength and in resistance to abrasion.

To obtain more consistent results it has been proposed to incorporate the air entraining agents at the mixer in quantities predetermined to produce the most satisfactory results under the conditions prevailing at the site of the work and with the specific aggregates used. This, however, is only a partial solution of the problem and, in order to obtain consistently good results, it is necessary to build integrity into the concrete by improving the cementing material.

The principal object of my invention is to provide a composition of matter which, in and of itself, is capable of combining with and stabilizing the lime radical released during the hydration of the Portland cement; and which also has latent cementitious properties adapting it to be substituted for part of the Portland cement which would ordinarily be employed; and which, in the presence of the lime released by the cement, will combine therewith and substantially enhance the density and strength of the concrete and its resistance to the disintegrating effects of freezing and thawing. In other words, the principal objective of my invention is to provide a chemical corrective for the Portland cement which may be incorporated in the concrete or mortar and be present and available therein, as and when necessary, for combining with the limy substances released by the cement as the hydration thereof progresses, and which, if not needed to form such a chemical combination with the lime, will remain as a stable, otherwise inert aggregate of a particle size which will enhance the density of the concrete and thereby reduce the absorption and permeability thereof.

My composition is formed principally of a water-cooled slag having a high silica content, a low lime content and a comparatively low magnesia content and which is further treated or combined with a special plasticizer or waterproofing agent for the purpose of stimulating the latent cementitious activity of the composition through the physical reaction of lowered water content demand.

The composition of the slag employed must be very closely controlled otherwise the results will not be satisfactory. Thus, the silica content of the slag should run from about 32 to about 40% by weight; the magnesia should be less than 6% because a high magnesia content which has been fused, as in slag, will produce, at later stages, an unstable concrete; and the lime content should be less than 47%.

A preferred slag analysis, in which the percentages stated are by weight, is as follows:

| | Percent |
|---|---|
| SiO2 | 32-40 |
| CaO less than | 47 |
| MgO less than | 6 |
| Al2O3 less than | 18 |
| S less than | 2 |
| FeO less than | 0.7 |

The slag is of course finely ground but the fineness may be varied to produce the densest and strongest concrete. Thus, in cases where the sand to be used is a well graded sand carrying sufficient fines to give a dense, strong concrete the slag aggregate should preferably be ground so that not less than 85% of the material will pass a 200 mesh sieve. Unless finely ground, the slag is not in the most favorable condition for combining with the lime released by the Portland cement.

In case a poorly graded sand is to be used, the slag may be ground so that it will all pass a 100 mesh sieve. In that case a portion, approximately 50%, of the slag would serve as a filler to give a better graded, fine aggregate and a denser and stronger concrete, while approximately 50% of the slag so ground would pass a 200 mesh sieve and be in available form for chemical combination with the lime released by the cement.

In the preparation of the slag, there is ground therewith a small quantity of a water-soluble hydroxy-alkyl amine or a salt or derivative thereof; the ethanol amines, and particularly triethanol amine, being preferred; which functions not only as a waterproofing and plasticizing agent but, as pointed out above, to stimulate the latent cementitious activity of the composition.

The quantity of the special stimulating agent in my composition is quite critical, but may vary from about 0.0033% to about 0.70%, by weight, depending upon the proportion of Portland cement in the concrete mix with which it is to be incorporated, and the quantity of grinding compound, if any, in said cement. The presence in any ordinary class of concrete of this agent and a grinding compound in quantities aggregating much in excess of about 0.05%, by weight, of the Portland cement therein is undesirable, and, as a general rule, the quantity of the hydroxy-alkyl amine in my composition will be designed to provide an amine content in the concrete of only from about 0.02% to 0.03%, by weight, of the Portland cement in said concrete. For example, where seven bags of Portland cement are to be used to form a batch of concrete and the cement carries very little or no grinding compound, if one bag of my composition containing 0.35% by weight of plasticizer were incorporated in the mix the plasticizer would constitute about 0.05%, by weight, of the Portland cement in the concrete.

Very excellent results both in increased resistance to freezing and thawing and also increased strength are attainable by replacing about 20% of the Portland cement which would ordinarily be used in any concrete with my composition. Comparative tests made in one laboratory between a straight Portland cement concrete and the same concrete in which 20% of the Portland cement was replaced by my composition showed the following results.

| Composition | Strength in lbs./sq. in. | |
|---|---|---|
| | 7 Days | 28 Days |
| 100% straight Portland cement conc. | 2,110 | 3,280 |
| 80% Portland cement concrete with 20% of my composition | 2,260 | 3,810 |

| Composition | Freezing and Thawing—Same No. of Cycles in each case | |
|---|---|---|
| | Percent Weight Loss | Percent Mod. of Elasticity Loss |
| 100% straight Portland cement concrete | 86.1 | 100 |
| 80% Portland cement concrete with 20% of my composition | 13.0 | 12.8 |

In other words, the concrete in which 20% of the Portland cement was replaced with my composition, was about 16% stronger in 28 days than the straight Portland cement concrete; and the weight loss when subjected to the same number of cycles of freezing and thawing was only about 15% of the loss in the straight Portland cement concrete.

Other comparative tests made in another laboratory showed results as follows:

| Composition | Strength in lbs./sq. in. | |
|---|---|---|
| | 7 Days | 28 Days |
| Straight Portland cement concrete | 2,416 | 2,711 |
| 92.2% Portland cement with 7.8% of my composition | 3,182 | 3,609 |

| Composition | Percent Weight Loss—Freezing and Thawing Cycles | | | |
|---|---|---|---|---|
| | 25 | 50 | 75 | 100 |
| Straight Portland cement concrete | 0.1 | 17.0 | 26.6 | 66.0 |
| 92.2% Portland cement with 7.8% of my composition | 0 | 10.1 | 16.8 | 28.0 |

From the foregoing it will be apparent that, by replacing a portion of the Portland cement which would ordinarily be employed in the concrete by an approximately equal weight of my composition, a concrete having not only higher strength but substantially greater resistance to weathering is produced. For these reasons my composition is particularly adapted for use in pavements and other structures which are exposed to freezing and thawing. In pavements which are subjected to heavy motor traffic it is particularly desirable because, the usual formation of calcium carbonate on the surface of the pavement and which, as pointed out above, is soluble in water containing carbon dioxide, is prevented, and thus, a potential cause of scaling is eliminated.

What I claim is:

1. A dry aggregate adapted to be substituted for and to replace a portion of the cement in Portland cement concrete; said aggregate consisting substantially of finely pulverized water-cooled slag containing, by weight, at least 32% of silica, less than about 47% of lime, and less than about 6% of magnesia, and having intimately mixed therewith from 0.0033% to about 0.70% of a hydroxy-alkyl amine; said aggregate having the properties of combining with and neutralizing the limy substances released by said Portland cement, as the hydration thereof progresses, to form additional cement in said concrete, and without impairing the strength thereof, endowing said concrete with substantially greater resistance to disintegration by freezing and thawing than it would otherwise have if formed with Portland cement alone, a mixture of Portland cement and said amine alone, or a mixture of Portland cement and slag alone.

2. A dry aggregate adapted to be substituted for and to replace a portion of the cement in Portland cement concrete; said aggregate consisting substantially of finely pulverized, water-cooled slag containing, by weight, at least 32% of silica, less than about 47% of lime, and less than about 6% of magnesia, and having intimately mixed therewith from 0.0033% to about 0.70% of triethanol amine; said aggregate having the properties of combining with and neutralizing the limy substances released by said Portland cement, as the hydration thereof progresses, to form additional cement in said concrete, and, without impairing the strength thereof, endowing said concrete with substantially greater resistance to disintegration by freezing and thawing than it would otherwise have if formed with Portland cement alone, a mixture of Portland cement and said amine alone, or a mixture of Portland cement and slag alone.

BERTRAND H. WAIT.

REFERENCES CITED

The following references are of record in the file of this patent:

UNITED STATES PATENTS

| Number | Name | Date |
| --- | --- | --- |
| 2,254,252 | Wertz | Sept. 2, 1941 |
| 2,031,621 | Tucker | Feb. 25, 1936 |
| 1,763,937 | Stievater | June 17, 1930 |

FOREIGN PATENTS

| Number | Country | Date |
| --- | --- | --- |
| 454,944 | Great Britain | Oct. 9, 1936 |